US011099705B1

(12) United States Patent
Wittke et al.

(10) Patent No.: US 11,099,705 B1
(45) Date of Patent: Aug. 24, 2021

(54) AUTOMATIC DASHBOARD TILES FOR ONLINE TOOLS

(71) Applicant: salesforce.com, inc., San Francisco, CA (US)

(72) Inventors: Eric Paul Wittke, Chicago, IL (US); Jon Belkowitz, Brooklyn, NY (US); Rick Muñoz, Oakland, CA (US); Narinder Singh, Medina, WA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/887,967

(22) Filed: May 29, 2020

(51) Int. Cl.
*G06F 3/0481* (2013.01)
*G06Q 30/02* (2012.01)

(52) U.S. Cl.
CPC ....... *G06F 3/0481* (2013.01); *G06Q 30/0246* (2013.01)

(58) Field of Classification Search
None
See application file for complete search history.

(56) References Cited

U.S. PATENT DOCUMENTS

| | | | | |
|---|---|---|---|---|
| 7,315,861 B2* | 1/2008 | Seibel | ................ | G06Q 30/0239 |
| 9,021,374 B2* | 4/2015 | Sola | ................ | G06F 16/248 |
| | | | | 715/763 |
| 9,535,575 B1* | 1/2017 | Labaj | ................ | G06F 16/11 |
| 10,084,650 B2* | 9/2018 | Kristjansson | ........... | H04L 41/22 |
| 10,101,889 B2* | 10/2018 | Prophete | ................ | G06Q 40/12 |
| 10,178,001 B2* | 1/2019 | Baumecker | ............. | G06F 11/32 |
| 10,320,633 B1* | 6/2019 | Wong | ................ | H04L 67/02 |
| 2011/0022630 A1* | 1/2011 | Madishetty | ........... | G06F 16/954 |
| | | | | 707/770 |
| 2016/0044132 A1* | 2/2016 | Croft | ................ | H04L 67/125 |
| | | | | 709/225 |
| 2016/0105335 A1* | 4/2016 | Choudhary | ........... | H04L 69/329 |
| | | | | 709/224 |
| 2016/0147380 A1* | 5/2016 | Coates | ................ | G06F 3/0481 |
| | | | | 715/736 |
| 2016/0246490 A1* | 8/2016 | Cabral | ................ | G06F 3/0481 |
| 2017/0123397 A1* | 5/2017 | Billi | ................ | G06Q 10/063 |
| 2017/0255476 A1* | 9/2017 | Whitney | ................ | G06F 9/451 |
| 2018/0137464 A1* | 5/2018 | Hansen | ................ | G06Q 10/101 |
| 2018/0165847 A1* | 6/2018 | Broadbent | ........ | G06Q 10/0637 |
| 2018/0248960 A1* | 8/2018 | Maheshwari | ....... | H04L 41/5032 |

(Continued)

OTHER PUBLICATIONS

The Authoritative Dictionary of IEEE Standards Terms Seventh Edition.(c) 2000. p. 701. (Year: 2000).*

*Primary Examiner* — Amy M Levy
(74) *Attorney, Agent, or Firm* — Sterne, Kessler, Goldstein & Fox P.L.L.C.

(57) ABSTRACT

Disclosed herein are system, method, and computer program product embodiments for automatically generating tiles. An embodiment operates by detecting a first node of a model has been populated with a first plurality of data values from a first online tool. The embodiment selects a tile logic block corresponding to the first node from a plurality of tile logic blocks. The embodiment generates a first tile associated with the first node by executing the tile logic block based on the first plurality of data values. The embodiment inserts the first tile into a dashboard configured to display a plurality of tiles. The embodiment then sends the dashboard for display.

19 Claims, 5 Drawing Sheets

(56) References Cited

U.S. PATENT DOCUMENTS

| | | | |
|---|---|---|---|
| 2018/0365873 A1* | 12/2018 | Prophete | G06T 13/80 |
| 2019/0034247 A1* | 1/2019 | Das | G06F 9/542 |
| 2019/0108046 A1* | 4/2019 | Spencer-Harper | G06F 9/451 |
| 2019/0220153 A1* | 7/2019 | Kidron | G06Q 10/06393 |

* cited by examiner

AUTOMATIC DASHBOARD TILES FOR ONLINE TOOLS

BACKGROUND

Users frequently access dashboards to get insights into their data. However, if the dashboard is missing tiles, the user is not getting the full picture. Moreover, the user might not even know or realize that tiles are missing or what data is available. Accordingly, what is needed is the automatic generation of tiles when data becomes available.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for the automatic generation of tiles for a dashboard. The tiles are generated based on data values provided by online tools (e.g., online marketing tools). Generation of the tiles is triggered by detection of the data values populating one or more nodes of a model (e.g., user intervention is not required to trigger generation of the tiles). The tiles may be generated using pre-existing tile logic blocks specific to the online tools or specific to the nodes. Alternatively, the tiles may be dynamically generated based on the measurement count and dimension count/types of the data values provided by the online tools. Generated tiles may be inserted into a dashboard for viewing by a user (e.g., a business entity).

Figure 1:
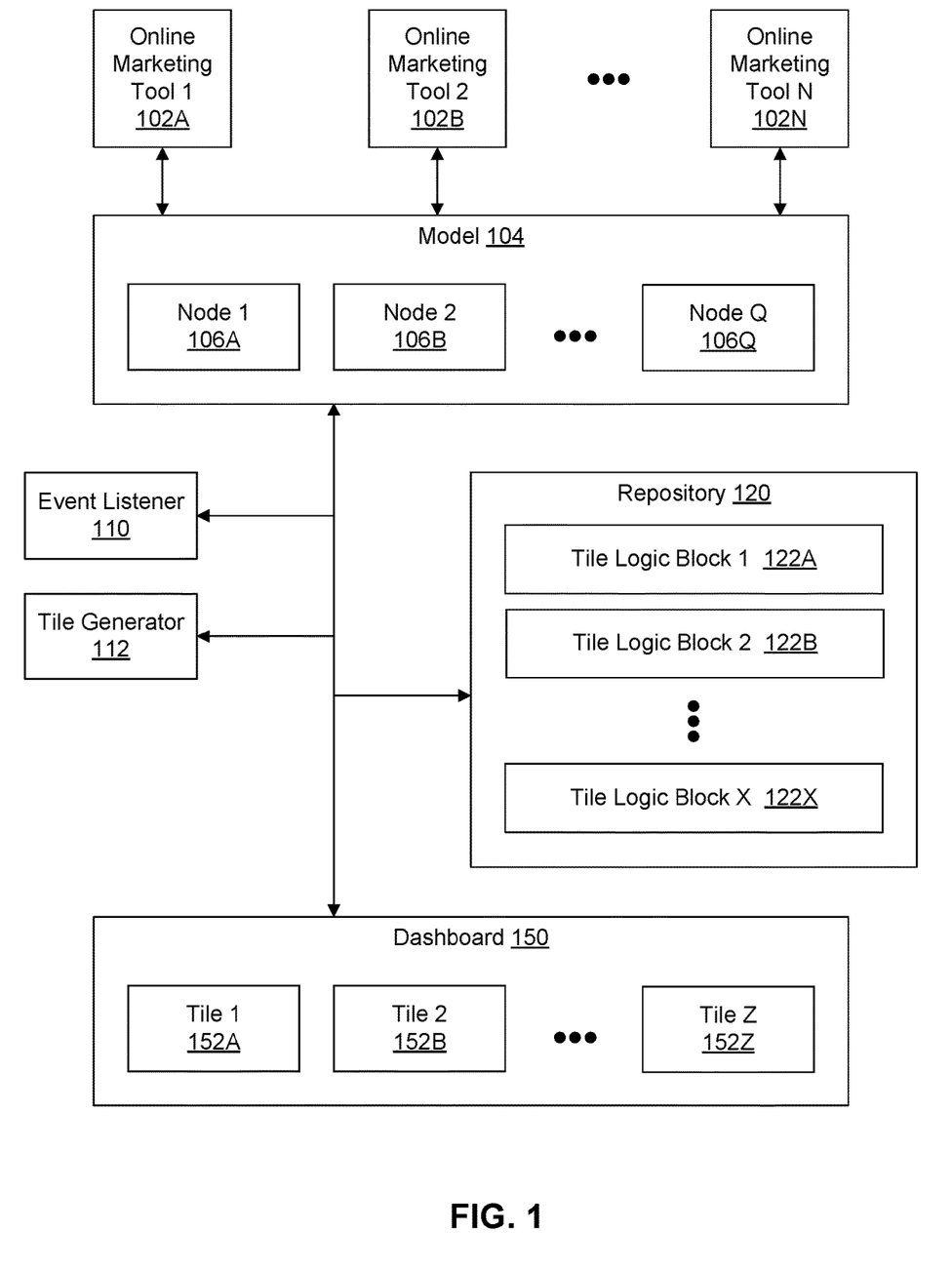
FIG. 1 shows a block diagram of a system for automatically generating dashboard tiles in accordance with one or more embodiments.

FIG. 1 shows a system for automatically generating dashboard tiles in accordance with one or more embodiments. As shown in FIG. 1, the system has multiple components including, for example, one or more online marketing tools (e.g., online marketing tool 1 102A, online marketing tool 2 102B, online marketing tool N 102N), a model 104, an event listener 110, a tile generator 112, a repository 120, and a dashboard 150. Each of these components (102, 104, 110, 112, 120, and 150) may execute on one or more computing devices (e.g., server, mainframe, desktop personal computer (PC), laptop, smart phone, tablet PC, etc.) connected by a network having wired and/or wireless segments. Moreover, two or more of the components (102, 104, 110, 112, 120, and 150) may execute on the same computing device.

In one or more embodiments, the online marketing tools 102 output data values regarding a user (e.g., business entity). These data values may include metrics associated with website traffic for the user's website and/or the user's online advertisements. For example, the data values may include session duration, pages per session, bounce rate etc. of individuals using the website, source of the traffic, impressions, cost-per-thousand impressions (CPM), clicks, cost-per-click (CPC), conversions, e-commerce activity such as transactions and revenue, etc. These data values may also include custom application events and web events and contextual information about those events. Although FIG. 1 focuses on online marketing tools, the system in FIG. 1 may be extended to other types of online tools and services.

In one or more embodiments, the model 104 has multiple nodes (e.g., node 1 106A, node 2 106B, node Q 106Q). The nodes 106 can be configured to be populated with the data values provided by the online marketing tools 102 (or other types of online tools and services). The data values may be pushed to one or more of the nodes 106 via an application programming interface (API). The identity of the online tool that provided the data values may be included in the data values. A description (e.g., labels) of the provided data values may also be included with the data values. Each of the nodes may be implemented using a database, a set of interconnected tables, an array, etc.

One example node is a website activity node that stores activity statistics (discussed above) regarding a user's website. One or more of the online marketing tools 102 supply these statistics for storage in the website activity node.

Another example node is a call history node that stores call history statistics (e.g., number of calls, average duration of calls, frequently called numbers, etc.). One or more of the online tools may correspond to or include digital phone tools that supply these call history statistics for storage in the call history node.

The event listener 110 can be configured to detect when a node 106 of the model 104 has been populated with data values. This may include periodically or randomly scanning the model 104 in search of newly stored data values. Additionally or alternatively, when an online marketing tool 102 populates a node 106 with data values, the online marketing tool 102 may send a message to the event listener 110 regarding the recently stored data values. The identity of the online marketing tool 102 as well as a description of the data values (e.g., label) may be included in the message.

The repository 120 stores multiple tile logic blocks (e.g., tile logic block 1 122A, tile logic block 2 122B, tile logic block X 122X). The tile logic blocks may be stored in the repository 120 before the data values are provided by the online tools. Each tile logic block 122 can be associated with an online marketing tool 102 (or another type of online tool). Additionally or alternatively, each tile logic block 122 can be associated with a node 106. A tile logic block 122 may be provided by the owner of an online marketing tool or by a third-party unaffiliated with the online marketing tool. Two or more logic blocks 122 may be associated with the same online marketing tool 102 or node 106. Each tile logic block can include instructions (e.g., function calls, code, etc.) for generating a tile based on the data values. The tile logic blocks 122 may be searched using the identity of the online marketing tool 102, and/or a description of data values (e.g., label), and/or the identity of the node 106 as search criteria. The result of a successful search can be an online tool-specific tile logic block 122 and/or a node-specific tile logic block 122. Although FIG. 1 shows only a single repository, in other embodiments there may be multiple repositories. For example, one repository may store node-specific tile logic blocks while another repository may store online tool-specific tile logic blocks.

In one or more embodiments, the tile generator 112 is configured to generate tiles by executing tile logic blocks 122. The data values stored in the model 104 can be inputs to the instructions (e.g., function calls, code, etc.) of the title logic blocks 122. The output of executing the tile logic block can be a tile with one or more graphics (e.g., bar chart, pie chart, XY plot, graph, etc.) and/or statistical measurements based on the data values. The instructions of a tile logic block may be specific to an online tool or node and the data type(s) provided by the online marketing tool and/or stored in the node. Accordingly, the resulting tile is custom for the online tool or node and conveys meaningful information (e.g., provides insight(s) to the data values provided by the online marketing tool) by way of the one or more graphics and/statistical measurements.

In one or more embodiments, when no tile logic block exists for an online tool or node, the tile generator 112 may dynamically generate a tile based on the measurement count and dimension count/types of the data values provided by the online marketing tool 102 (discussed below). Although the resulting tile still conveys meaning information, it is not customized for the online marketing tool or node (discussed below).

The dashboard 150 can be configured to display multiple tiles (e.g., tile 1 152A, tile 2 152B, tile Z 152Z). Each time a tile 152 is generated by the tile generator 112, the tile can be inserted into the dashboard 150. All of the tiles 152 in the dashboard 150, both individually and in combination, can give the user insight into the data values stored in the model 104.

Figure 2:
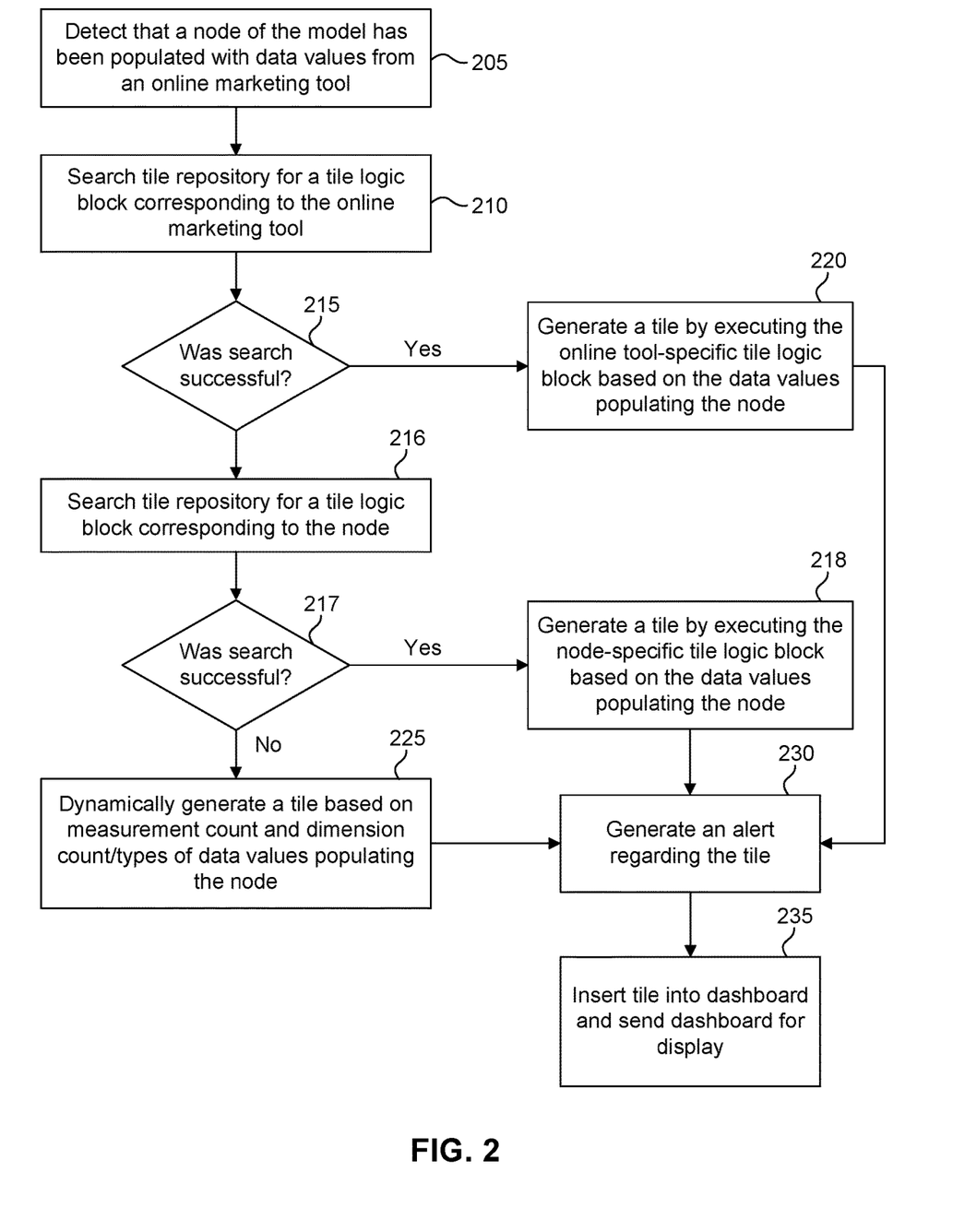
FIG. 2 shows a flowchart for automatically generating dashboard tiles in accordance with one or more embodiments.

FIG. 2 shows a flowchart for automatically generating dashboard tiles in accordance with one or more embodiments. The steps in FIG. 2 may be executed by one or more of the components (e.g., event listener 110, tile generator 112) discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2. The steps shown in FIG. 2 may be implemented as computer-readable instructions stored on computer-readable media, where, when the instructions are executed, cause a processor to perform the process of FIG. 2

In Step 205, it is detected (e.g., by event listener 110) that a node of the model has been populated with data values from an online tool (e.g., online marketing tool). As discussed above, the model may be configured to store data values of various types in one or more nodes. One or more online marketing tools may push the data values to the model via APIs. The data values may include the identity of the online marketing tool that provided the data values in addition to a description (e.g., labels) of the provided data values. In one or more embodiments, detecting may be accomplished by continuously monitoring (e.g., by event listener 110) the nodes of the model for newly stored data. Additionally or alternatively, detecting may be accomplished by receiving (e.g., by the event listener 110) a message issued by an online marketing tool and indicating that new data values have been stored in one or more nodes, etc. The message may include the identity of the online marketing tool, the types of the data values, the descriptions of the data values, etc.

In Step 210, a repository (e.g., repository 120) is searched for a tile logic block corresponding to the online tool. The searching may be executed by the event listener 110. As discussed above, the repository stores multiple tile logic blocks. A tile logic block may be specific to an online tool. Two or more logic blocks may be specific to the same online tool. Each tile logic block includes instructions (e.g., function calls, code, etc.) for generating a tile based on the data values provided by an online tool. The identity of the online tool, from Step 205, may be used as a criterion for searching the repository. The types or labels of the data values may also be used as criteria for searching the repository.

In Step 215, it is determined (e.g., by the event listener 110) whether the search was successful. In other words, it is determined whether a tile logic block exists for the online tool. When it is determined that a tile logic block exists for the online tool, the process proceeds to Step 220. However, because many online tools exist and more are being developed every day, it is also possible that a tile logic block does not yet exist for the online tool and thus is not present in the tile repository (e.g., repository 120). In such scenarios, the search is unsuccessful, and the process proceeds to Step 216.

In one or more embodiments, if multiple online tools are populating a node and a tile logic block exists for each online marketing tool, one of the tile logic blocks (e.g., corresponding to one of the online marketing tools) may be selected at random. Additionally or alternatively, the user may be prompted to select one of the tile logic blocks.

In Step 220, the search of step 210 is successful, and a tile (e.g., tile 1 152A) is generated by executing the tile logic block corresponding to the online tool based on the newly stored data values. The tile may be generated by the tile generator 112. For example, the newly stored data values can be inputs to the instructions (e.g., function calls, code, etc.) of the title logic block. The output of executing the tile logic block can be a tile with one or more graphics (e.g., bar chart, pie chart, XY plot, graph, etc.) and/or statistical measurements based on the newly stored data values. The instructions of the tile logic block specific to the online marketing tool and the data type provided by the online marketing tool. Accordingly, the resulting tile can be custom for the online tool and can convey meaningful information (e.g., provides insight(s) to the newly stored data values) by way of the one or more graphics and/statistical measurements.

In Step 216, the search of step 210 has been unsuccessful. Accordingly, a repository (e.g., repository 120) is searched for a tile logic block corresponding to the node. The searching may be executed by the event listener 110. As discussed above, the repository can store multiple tile logic blocks. A tile logic block may be specific to a node. Two or more logic blocks may be specific to the same node. Each tile logic block can include instructions (e.g., function calls, code, etc.) for generating a tile based on the data values in the node. The identity of the node, from Step 205, may be used as a criterion for searching the repository. The types or labels of the data values may also be used as criteria for searching the repository.

In Step 217, it is determined (e.g., by the event listener 110) whether the search was successful. In other words, it is determined whether a tile logic block exists for the node (e.g., a node-specific tile logic block). When it is determined that a tile logic block exists for the node, the process proceeds to Step 218. If the search is unsuccessful, the process proceeds to Step 225.

In Step 218, the search of step 216 is successful, and a tile (e.g., tile 1 152A) is generated by executing the tile logic block corresponding to the node based on the newly stored data values. The tile may be generated by the tile generator 112. Step 218 is similar to Step 220 (discussed above).

In Step 225, the search of step 216 has been unsuccessful. In other words, there is no node-specific tile logic block and there is no online tool-specific tile logic block. This might be the result of the online tool being new and thus no tile logic block exists for it. In Step 225, a tile (e.g., tile 2 152B) may be dynamically generated based on the measurement count and dimension count/types of the newly stored values. The tile may be generated by tile generator 112.

For example, if a "point-of-sale purchase receipts" node in the model is populated with data values, then the format of the tile would be determined around how to best show "purchasing information." Examples might include using different colors to represent monetary vs. non-monetary data, and time comparisons relevant to purchases (e.g., sliding window methods, period-vs-period methods, fiscal quarters, etc.).

As another example, display information for the tile can be derived from the type of Dimension or Measurement. For example, if data values include dates, dates may be used as the X-axis on a chart. If the data values include a long decimal, then they might be rounded to the right precision. If the data values include 2 different measurements that are sliced by the same dimension, two different Y axis may be utilized.

As another example, the Y-axis displayed on the tile may depend on the variance of the data to be displayed. When the data only fluctuates within a narrow range (e.g, delivery rate, body mass index, maximal oxygen consumption (VO2 Max), blood pressure, etc.), then only a portion of the axis is shown to emphasize the variations. For example, delivery rate rarely falls outside of 97%-99%, so showing a Y axis range of 95%-100% would emphasize variations better than a range of 0%-100%.

As yet another example, the tile may be made interactive when the data includes objects specific to the system. When the objects are displayed on the tile (e.g., in a chart), a user can select a displayed object and jump to the details page for the object. Although the resulting tile can still convey meaningful information, it might not be customized for the online tool and it might not be customized for the node. Accordingly, the resulting graphics and/or statistical measurements on the resulting tile might not convey the meaning behind the newly stored data values as well as graphics and statistical measurements from a tile logic block specific to the online tool.

In Step 230, an alert is issued for the user. The alert may be issued by the component that generated the tile (e.g., tile generator 112). The alert may be in the form of a GUI with text indicating that a new tile has been generated and thus there is insight to be gained regarding the newly populated data values from display the tile. The user may respond to the alert with a request to view the tile (e.g., in a dashboard). In other words, the request to view the tile/dashboard is received from a user.

In Step 235, the newly generated tile is inserted into a dashboard (e.g., dashboard 150) that may include additional tiles. The tile may be inserted into the dashboard by the component that generated the tile (e.g., tile generator 112). The dashboard with the tiles may be sent to the user's computing device (e.g., desktop PC, laptop, smart phone, tablet PC, etc.) for display. All of the tiles in the dashboard, both individually and in combination, can give the user insight into the data values stored in the model.

The process shown in FIG. 2 may be repeated multiple times, resulting in numerous new tiles being inserted into one or more dashboards.

Those skilled in the art, having the benefits of this detailed description, will appreciate that regardless of whether the tile is generated in Step 218, Step 220, or Step 225, aside from the embodiments where the user is prompted to select one of the tile logic blocks (discussed above), the tile is generated without any user action/input. Instead, generation of the tile is automatically triggered by detecting the newly stored data values in the model. Even if a tile logic block does not exist for the online marketing tool that provided the data values or the node in which the data values were stored, tiles can still be generated using the dynamic generation feature discussed above in Step 225. Accordingly, the dashboard can never have missing tiles and the user can always be provided with the full picture of all the data. These are improvements to the technical fields of online tool and dashboard management.

Figure 3:
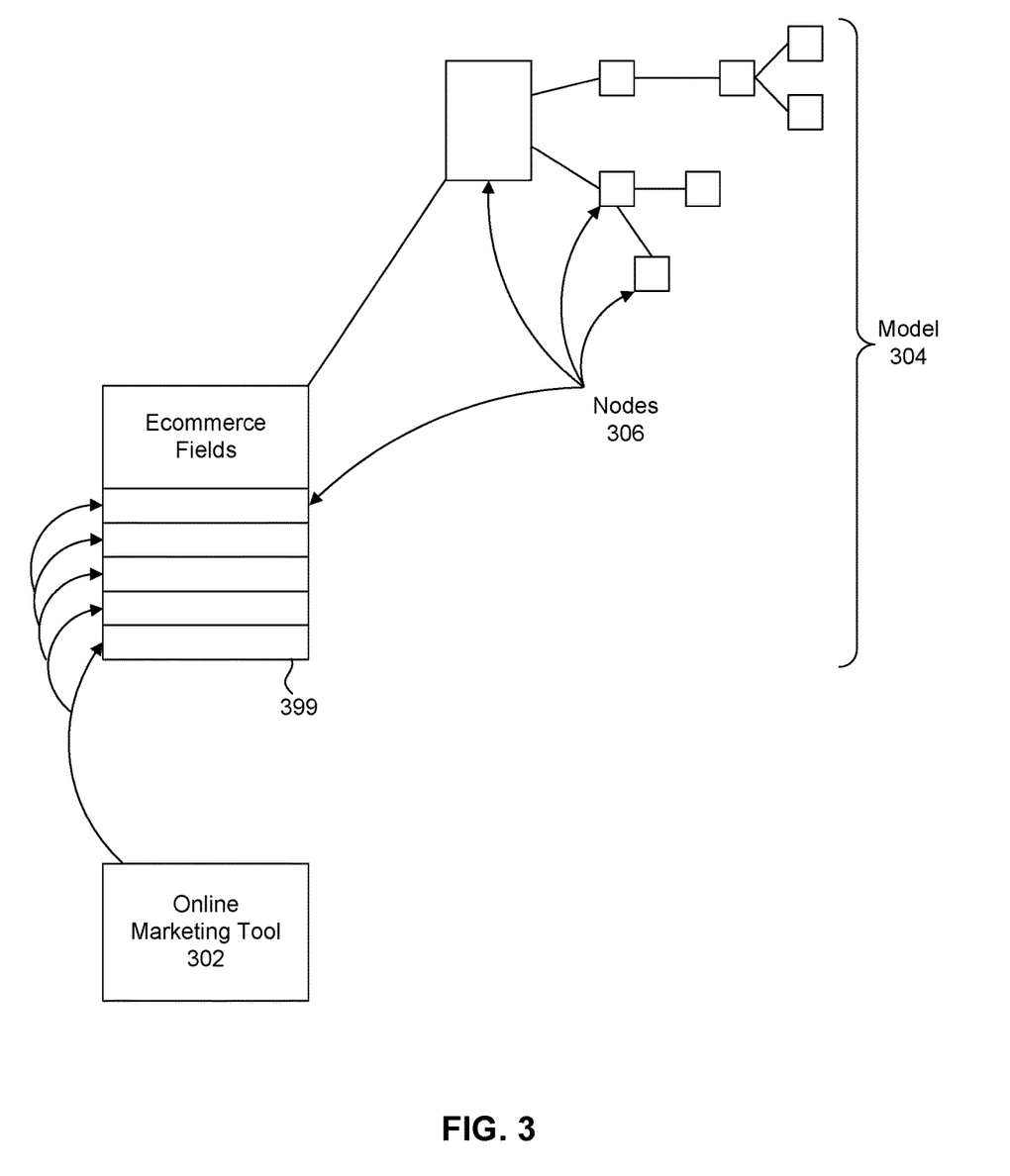
FIG. 3 shows an example of node population by an online marketing tool in accordance with one or more embodiments.

FIG. 3 shows an example of node population in accordance with one or more embodiments. In other words, FIG. 3 shows an example of what may occur just before execution of Step 205 in FIG. 2.

As shown in FIG. 3, there exists a model 304. The model 304 may be an example of model 104, discussed above in reference to FIG. 1. The model 304 includes multiple nodes 306 for storing data values provided by online marketing tools. These nodes 306 may be implemented using databases, interconnected tables, linked-lists, etc. For example, at least one of the nodes 306 is implemented as a list 399 with fields.

Still referring to FIG. 3, there also exists an online marketing tool 302. The online marketing tool 302 may correspond to any of the online marketing tools 102, discussed above in reference to FIG. 1. The online marketing tool 302 pushes data values associated with a user (e.g., a business entity) to the list 399. The data values stored in the list 399 may correspond to e-commerce activity regarding the user. The data values may be pushed to the list 399 via an API (not shown).

Figure 4:
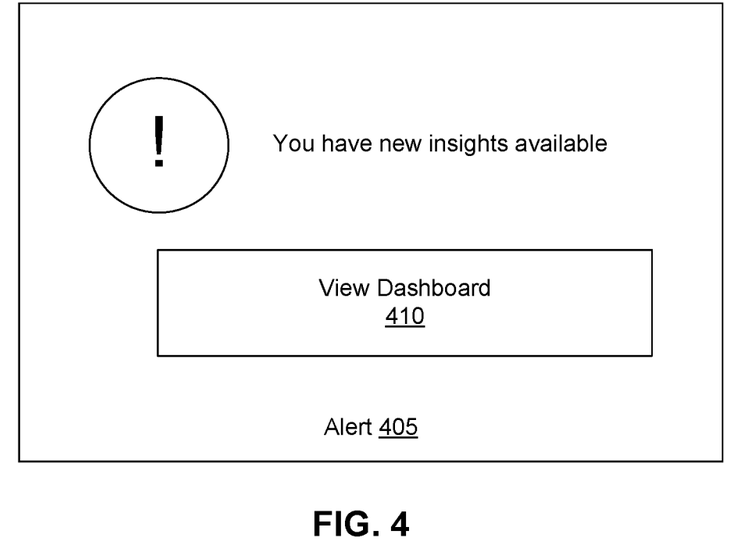
FIG. 4 shows an example of an alert following the automatic generation of a tile in accordance with one or more embodiments.

FIG. 4 shows an example of an alert 405 in accordance with one or more embodiments. The alert 405 may correspond to the alert in Step 230 of FIG. 2. Accordingly, the alert 405 may be generated and displayed to a user (e.g., business entity) following the automatic generation of a new tile. The alert 405 informs the user that new insights (i.e., a new tile) into the data values in the model are available for viewing. The alert 405 may include a view dashboard button 410. The user may request to view the dashboard by selecting the view dashboard button 410.

Figure 5:
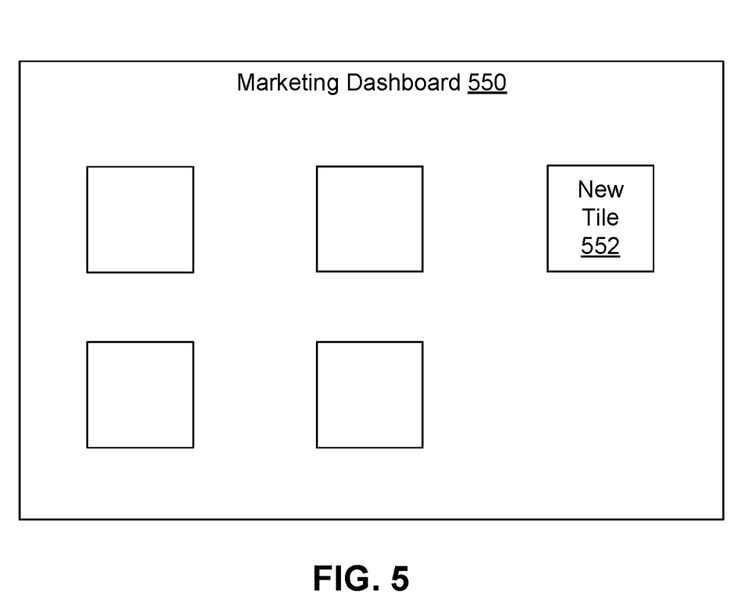
FIG. 5 shows an example of a dashboard with tiles in accordance with one or more embodiments.

FIG. 5 shows a marketing dashboard 550 in accordance with one or more embodiments. The marketing dashboard 550 may correspond to dashboard 150, discussed above in reference to FIG. 1. The marketing dashboard 550 may be sent to a user computing device for display in response to invoking the view dashboard button 410, discussed above in reference to FIG. 4. As shown in FIG. 5, the marketing dashboard 550 includes new tile 552 among other tiles. New tile 552 was automatically generated using the process discussed above in reference to FIG. 2. New tile 552 may include graphics (e.g., charts, graphs, etc.) and statistical measurements corresponding to the data values pushed by the online marketing tool 302 to the list 399. The other tiles in the marketing dashboard 550 may correspond to other data values in the model 304.

Figure 6:
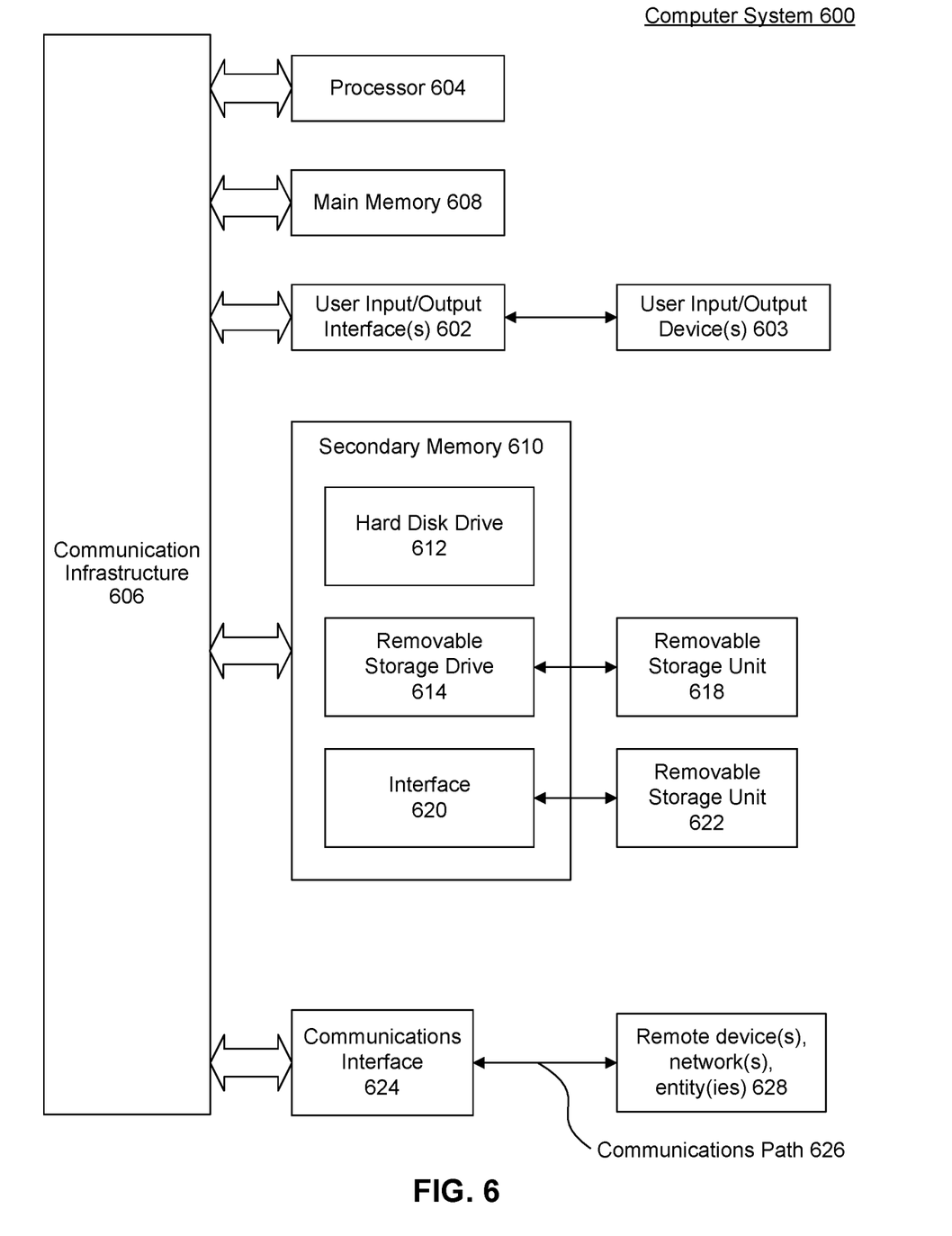
FIG. 6 shows an example computer system useful for implementing various embodiments.

Various embodiments can be implemented, for example, using one or more computer systems, such as computer system 600 shown in FIG. 6. Computer system 600 can be used, for example, to implement the process shown in FIG. 2. Computer system 600 can also be used to implement the GUIs shown in FIG. 4 and FIG. 5. For example, computer system 600 can automatically generate a new tile for a dashboard upon detecting a node of the model being populated with data values from an online marketing tool. Computer system 600 can be any computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method, comprising:
   detecting, by a computing device, a first node of a model has been populated with a first plurality of data values from a first online tool,
   wherein the model is composed of a plurality of related nodes, and
   wherein the detecting comprises receiving a message issued by the first online tool and indicating that the first plurality of data values have been stored in the first data structure;
   in response to the detecting, executing, by the computing device, an initial search of a repository storing a plurality of tile logic blocks for a tile logic block specific to the first online tool using an identity of the first online tool as a search criterion;
   in response to the initial search being unsuccessful and the plurality of tile logic blocks not including a tile logic block specific to the first online tool, executing a search of the repository for a tile logic block specific to the node using an identity of the first node as a search criterion,
   wherein each of the plurality of tile logic blocks stored in the repository is associated with an online tool or a node of the plurality of related nodes;
   selecting, by the computing device, a tile logic block of the plurality of tile logic blocks specific to the first node and identified during the search;
   generating, by the computing device, a first tile by executing the tile logic block based on the first plurality of data values;
   inserting, by the computing device, the first tile into a dashboard configured to display a plurality of tiles; and
   sending, by the computing device, the dashboard for display.

2. The method of claim 1, further comprising:
   detecting, by the computing device, a second node of the model has been populated with a second plurality of data values from a second online tool;
   determining, by the computing device, the plurality of tile logic blocks does not comprise a tile logic block corresponding to the second online tool or a tile logic block corresponding to the second node;
   generating, by the computing device, a second tile based on a measurement count and a dimension type of the second plurality of data values in response to the determining; and
   inserting, by the computing device, the second tile into the dashboard.

3. The method of claim 1, wherein the first plurality of data values are pushed to the model using an application programming interface (API).

4. The method of claim 1, wherein executing the tile logic block results in a graph corresponding to the first plurality of data values, and wherein the first tile comprises the graph.

5. The method of claim 1, wherein the first plurality of values comprises website traffic metrics.

6. The method of claim 1, wherein the first node comprises a plurality of interconnected tables and the plurality of first data values populate a plurality of fields in the plurality of interconnected tables.

7. The method of claim 1, further comprising:
   sending, by the computing device, an alert for display after generating the first tile; and
   receiving, by the computing device, a request to view the dashboard based on the alert,
   wherein sending the dashboard is based on the request.

8. A system, comprising:
   a memory; and
   at least one processor coupled to the memory and configured to:
   detect a first node of a model has been populated with a first plurality of data values from a first online tool,
   wherein the model is composed of a plurality of related nodes, and
   wherein the detecting comprises receiving a message issued by the first online tool and indicating that the first plurality of data values have been stored in the first data structure;
   in response to the detecting, execute an initial search of a repository storing a plurality of tile logic blocks for a tile logic block specific to the first online tool using an identity of the first online tool as a search criterion;
   in response to the initial search being unsuccessful and the plurality of tile logic blocks not including a tile logic block specific to the first online tool, execute a search of the repository for a tile logic block specific to the node using an identity of the first node as a search criterion,
   wherein each of the plurality of tile logic blocks stored in the repository is associated with an online tool or a node of the plurality of related nodes;
   select a tile logic block of the plurality of tile logic blocks specific to the first node and identified during the search;
   generate a first tile by executing the tile logic block based on the first plurality of data values;
   insert the first tile into a dashboard configured to display a plurality of tiles; and
   send the dashboard for display.

9. The system of claim 8, wherein the at least one processor is further configured to:
   detect a second node of the model has been populated with a second plurality of data values from a second online tool;
   determine the plurality of tile logic blocks does not comprise a tile logic block corresponding to the second online tool or a tile logic block corresponding to the second node;
   generate a second tile based on a measurement count and a dimension type of the second plurality of data values in response to the determining; and
   insert the second tile into the dashboard.

10. The system of claim 8, wherein the at least one processor is further configured to:
    send an alert for display after generating the first tile; and
    receive a request to view the dashboard based on the alert,
    wherein sending the dashboard is based on the request.

11. The system of claim 8, wherein the first plurality of data values are pushed to the model using an application programming interface (API).

12. The system of claim 8, wherein executing the tile logic block results in a graph corresponding to the first plurality of data values, and wherein the first tile comprises the graph.

13. The system of claim 8, wherein the first plurality of values comprises website traffic metrics.

14. The system of claim 8, wherein the first node comprises a plurality of interconnected tables and the plurality of first data values populate a plurality of fields in the plurality of interconnected tables.

15. A non-transitory computer readable medium (CRM) having instructions stored thereon that, when executed by at least one computing device, cause the at least one computing device to perform operations comprising:
- detecting a first node of a model has been populated with a first plurality of data values from a first online tool, wherein the model is composed of a plurality of related nodes, and
  wherein the detecting comprises receiving a message issued by the first online tool and indicating that the first plurality of data values have been stored in the first data structure;
- in response to the detecting, executing an initial search of a repository storing a plurality of tile logic blocks for a tile logic block specific to the first online tool using an identity of the first online tool as a search criterion;
- in response to the initial search being unsuccessful and the plurality of tile logic blocks not including a tile logic block specific to the first online tool, executing a search of the repository for a tile logic block specific to the node using an identity of the first node as a search criterion,
- wherein each of the plurality of tile logic blocks stored in the repository is associated with an online tool or a node of the plurality of related nodes;
- selecting a tile logic block of the plurality of tile logic blocks specific to the first node and identified during the search;
- generating a first tile by executing the tile logic block based on the first plurality of data values;
- inserting the first tile into a dashboard configured to display a plurality of tiles; and
- sending the dashboard for display.

16. The non-transitory CRM of claim 15, wherein the operations further comprise:
- detecting a second node of the model has been populated with a second plurality of data values from a second online tool;
- determining the plurality of tile logic blocks does not comprise a tile logic block corresponding to the second online tool or a tile logic block corresponding to the second node;
- generating a second tile based on a measurement count and a dimension type of the second plurality of data values in response to the determining; and
- inserting the second tile into the dashboard.

17. The non-transitory CRM of claim 15, wherein the operations further comprise:
- sending an alert for display after generating the first tile; and
- receiving a request to view the dashboard based on the alert,
- wherein sending the dashboard is based on the request.

18. The non-transitory CRM of claim 15, wherein the first plurality of data values are pushed to the model using an application programming interface (API).

19. The non-transitory CRM of claim 15, wherein executing the tile logic block results in a graph corresponding to the first plurality of data values, and wherein the first tile comprises the graph.

* * * * *